(12) United States Patent
Perronnin et al.

(10) Patent No.: US 8,380,647 B2
(45) Date of Patent: Feb. 19, 2013

(54) TRAINING A CLASSIFIER BY DIMENSION-WISE EMBEDDING OF TRAINING DATA

(75) Inventors: Florent C. Perronnin, Domène (FR); Jorge Sanchez, Cordoba (AR); Yan Liu, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 859 days.

(21) Appl. No.: 12/541,636

(22) Filed: Aug. 14, 2009

(65) Prior Publication Data

US 2011/0040711 A1 Feb. 17, 2011

(51) Int. Cl.
*G06F 17/00* (2006.01)
*G06N 5/00* (2006.01)
(52) U.S. Cl. ........................................................ 706/15
(58) Field of Classification Search ...................... 706/45
See application file for complete search history.

(56) References Cited

U.S. PATENT DOCUMENTS

| | | | |
|---|---|---|---|
| 7,233,695 B2 * | 6/2007 | Curry et al. | 382/162 |
| 7,382,489 B2 * | 6/2008 | Curry et al. | 358/1.9 |
| 8,280,828 B2 * | 10/2012 | Perronnin et al. | 706/12 |
| 2007/0005356 A1 | 1/2007 | Perronnin | |
| 2007/0258648 A1 | 11/2007 | Perronnin | |
| 2008/0069456 A1 | 3/2008 | Perronnin | |
| 2009/0144033 A1 | 6/2009 | Liu et al. | |

FOREIGN PATENT DOCUMENTS

EP 1 770 612 4/2007

OTHER PUBLICATIONS

Perronnin, et al. "Large-Scale Image Categorization with Explicit Data Embedding," IEEE Conference on Computer Vision and Pattern Recognition (CVPR), Jun. 13-18, 2010.
Hotta. "Non-Linear Feature Extraction by Linear PCA Using Local Kernel," 19th International Conference on Pattern Recognition (ICPR), 2008.
Rieck, et al. "Computation of Similarity Measures for Sequential Data using Generalized Suffix Trees," Twentieth Annual Conference on Neural Information Processing Systems (NIPS), 2006.
Müller, "An Introduction to Kernel-Based Learning Algorithms," IEEE Transactions on Neural Networks, vol. 12, Issue 2, Mar. 2001.
Schölkopf, et al. "Nonlinear Component Analysis as a Kernel Eigenvalue Problem," Technical Report No. 44, Dec. 1996.
Maji, et al. "Classification using Intersection Kernel Support Vector Machines is Efficient," CVPR 2008.
Csurka, et al., Incorporating Geometry Information with Weak Classifiers for Improved Generic Visual Categorization, *ICIAP* 2005: 612-620 *CVPR* 2007 (Abstract).

(Continued)

*Primary Examiner* — Michael B Holmes
(74) *Attorney, Agent, or Firm* — Fay Sharpe LLP (57) ABSTRACT

A classifier training method and apparatus for training, a linear classifier trained by the method, and its use, are disclosed. In training the linear classifier, signatures for a set of training samples, such as images, in the form of multi-dimension vectors in a first multi-dimensional space, are converted to a second multi-dimension space, of the same or higher dimensionality than the first multi-dimension space, by applying a set of embedding functions, one for each dimension of the vector space. A linear classifier is trained in the second multi-dimension space. The linear classifier can approximate the accuracy of a non-linear classifier in the original space when predicting labels for new samples, but with lower computation cost in the learning phase.

26 Claims, 3 Drawing Sheets

OTHER PUBLICATIONS

Csurka, et al., Visual Categorization with Bags of Keypoints, In *ECCV Workshop on Statistical Learning for Computer Vision*, 2004.
Fowlkes, et al., Spectral Grouping Using the Nyström Method, In *IEEE PAMI*, 2004.
Krishnapuram, et al., Sparse Multinomial Logistic Regression: Fast Algorithms and Generalization Bounds, *IEEE PAMI*, 27(6):957-968, 2005.
Palmer, et al., Generalized Kernel Classification and Regression, *UCSD Tech. Rept.*, 2004.
Perronnin, et al., Adapted Vocabularies for Generic Visual Categorization, *ECCV* (4) 464-475 (2006).
Perronnin, et al., Fisher Kernels on Visual Vocabularies for Image Categorization, In *IEEE CVPR*, 2007.
Rahimi, et al., Random Features for Large-Scale Kernel Machines, In *NIPS*, 2007.
Sivic, et al., Video Google: A Text Retrieval Approach to Object Matching in Videos, In *IEEE ICCV*, 2003.
Weiss, et al., Spectral Hashing, In *NIPS*, 2008.
Williams, et al., Using the Nyström Method to Speed Up Kernel Machines, In *NIPS*, 2001.
U.S. Appl. No. 12/252,531, filed Oct. 16, 2008, Perronnin, et al.
U.S. Appl. No. 12/483,391, filed Jun. 12, 2009, Perronnin, et al.

* cited by examiner

TRAINING A CLASSIFIER BY DIMENSION-WISE EMBEDDING OF TRAINING DATA

CROSS REFERENCE TO RELATED PATENTS AND APPLICATIONS

The following reference, the disclosure of which is incorporated in its entirety by reference, is mentioned:

U.S. application Ser. No. 12/483,391, filed Jun. 12, 2009, entitled ACCURATE AND EFFICIENT CLASSIFICATION OF FISHER VECTORS, by Florent Perronnin, et al.

BACKGROUND

The following relates to the information processing arts, information storage arts, classification arts, and related arts. It finds particular application in connection with the development and use of a linear classifier which operates in a different space than labeled training sample vectors that are representative of images or other objects, and will be described with particular reference thereto.

Digital objects, such as images, speech segments, text documents, and the like are commonly represented as digital files or digital representations, for example as bitmaps or grayscale or color pixel maps in the case of images, audio files in the case of speech segments, or text or word processing files in the case of text documents. In the processing and/or storage of such objects, it is useful to classify the objects automatically, with respect to one or more classes. For example, pictorial images can be classified by subject matter, e.g., images of cats, images of dogs, images of vehicles, images of people.

To facilitate classification, a signature of the object is generated, which may be in the form of a vector having a relatively high dimensionality, i.e., which is sufficient to provide a unique signature for each object, but which incorporates substantially less data than the original object. Thus, for example, an image containing millions of pixels may be represented by a vector having perhaps 128-10,000 dimensions. For images, a suitable vector can be generated by computing features of selected image patches or sampling regions distributed across the image, and employing the computed features as elements of the feature vector or as inputs to a model which assigns a vector based thereon. For images, a Fisher vector or "bag-of-visual-words" vector representation can be used as a suitable vector representation. In the case of text documents, a "bag-of-words" vector representation is sometimes used, in which each vector element corresponds to a word and has a value indicative of a count of occurrences of that word in the text document.

The classifier receives the vector representation of the object and outputs a classification based on the vector representation. Where there are multiple classes, this can be considered as a series of two class decision problems where each class is evaluated against the rest. The classification may be hard (e.g., "1" if the object is assigned to the class or "0" otherwise), or can be soft (e.g., the classification output is a value between 0 and 1 inclusive with higher values indicating a higher likelihood of membership in the class). A soft classification can be converted to a hard classification by thresholding. Typically, the classifier has adjustable parameters whose values are determined by training with a labeled training set. The objective of the training is to select the adjustable parameters such that the output of the classifier substantially agrees with the classification labels assigned to the objects of the training set.

In general, classifiers may be linear or nonlinear. Linear classifiers, such as those using some form of logistic regression, are typically more computationally efficient than nonlinear classifiers, such as those employing kernel learning. However, nonlinear classifiers are typically more accurate than linear classifiers. When the dataset used in learning the classifier parameters is large, the training cost, in terms of the computation time for a non-linear classifier, can be significant. It would be advantageous to train a classifier which has an accuracy which approaches the accuracy that is typical of nonlinear classifiers, but which has a computational cost more typical of linear classifiers.

INCORPORATION BY REFERENCE

The following references, the disclosures of which are incorporated herein by reference in their entireties, are mentioned:

U.S. Pub. No. 2007/0005356, entitled GENERIC VISUAL CATEGORIZATION METHOD AND SYSTEM, U.S. Pub. No. 2007/0258648, entitled GENERIC VISUAL CLASSIFICATION WITH GRADIENT COMPONENTS-BASED DIMENSIONALITY ENHANCEMENT, U.S. Pub. No. 2008/0069456 entitled BAGS OF VISUAL CONTEXT-DEPENDENT WORDS FOR GENERIC VISUAL CATEGORIZATION, all by Florent Perronnin, U.S. Pub. No. 2009/0144033, published Jun. 4, 2009, entitled OBJECT COMPARISON, RETRIEVAL, AND CATEGORIZATION METHODS AND APPARATUSES, by Yan Liu, et al., and U.S. Ser. No. 12/252,531, filed Oct. 16, 2008, entitled MODELING IMAGES AS MIXTURES OF IMAGE MODELS, by Florent Perronnin, et al. disclose systems and methods for categorizing images based on content. See also, Florent Perronnin, Christopher R. Dance, Gabriela Csurka, Marco Bressan: Adapted Vocabularies for Generic Visual Categorization. ECCV (4) pp. 464-475 (2006); Florent Perronnin, Christopher R. Dance: Fisher Kernels on Visual Vocabularies for Image Categorization. *IEEE CVPR*, (2007); Gabriela Csurka, Jutta Willamowski, Christopher R. Dance, Florent Perronnin: Incorporating Geometry Information with Weak Classifiers for Improved Generic Visual Categorization. ICIAP pp. 612-620 (2005).

BRIEF DESCRIPTION

In accordance with one aspect of the exemplary embodiment, a classifier training method includes providing a set of training samples each training sample comprising a training vector in a first multi-dimension space representative of an object and a class label for the object. For at least a subset of the training samples, the method includes deriving a set of embedding functions, the embedding functions including one embedding function per dimension of the first multidimensional space, for embedding each of the training vectors that are in the first multi-dimension space into a second multi-dimension space of the same or higher dimensionality than the first multi-dimension space. With the embedding functions, a set of embedded vectors in the second multi-dimension space corresponding to the training vectors is generated, the embedding functions including one embedding function per dimension of the first multi-dimension space. A linear classifier is trained on the set of embedded training vectors and their class labels to generate a trained linear classifier operative in the second multi-dimension space for predicting labels for unlabeled sample vectors. A computer processor may be used in performance of the method.

In another aspect, an apparatus for training a linear classifier, which approximates a non-linear classifier in a first multi-dimension space, in a second multi-dimension space, is disclosed. The apparatus includes memory which stores instructions which, for at least a subset of an input set of training samples, each training sample in the set comprising a training vector in the first multi-dimension space and a class label, derive a set of embedding functions for embedding each of the training vectors that are in the first multi-dimension space into the higher multi-dimension space; with the embedding functions, generate a set of embedded vectors in the second multi-dimension space corresponding to the training vectors; and train a linear classifier on the set of embedded training vectors and their class labels to generate a trained linear classifier operative in the second multi-dimension space for predicting labels for unlabeled vectors. A processor, in communication with the memory, executes the instructions.

In another aspect, a classification apparatus includes memory which stores a linear classifier configured for classifying a test sample vector input in a first multi-dimension space, the classifier operating in a second multi-dimension space of the same or higher dimensionality than the first multi-dimension space. Instructions for embedding an input test sample vector into the second multi-dimension space and for classifying the embedded vector with the linear classifier are stored in memory. The embedding instructions include, for each of D dimensions of the first multi-dimension space, generating an E dimensional vector, and concatenating the E dimensional vectors to form a DE dimensional vector, where D is at least 50 and E is at least 1. A processor in communication with the memory executes the instructions.

DETAILED DESCRIPTION

Aspects of the exemplary embodiment relate to a method and apparatus for learning parameters of a linear classifier using training data in a first multi-dimension space which has been embedded in a second multi-dimension space of the same or higher dimensionality. The method allows learning of a linear classifier which approaches the accuracy of kernel classifiers without the high computational cost associated with learning a kernel classifier.

As used herein an "object" can be any digital data structure, such as an image, text file, audio file, combination thereof, or the like for which an object representation can be generated based on features extracted from the object. Input objects may be stored in data memory during processing. Images, as used herein, may be pictorial images, such as photographs or video images, scanned images, such as scanned handwritten or typed documents, combined images which include photographs along with text, and/or graphics, or the like. The images may be received in JPEG, GIF, JBIG, BMP, TIFF or other common file format used for images and which may optionally be converted to another suitable format prior to processing. In the case of an image, the features can be related to pixel color, where color can be expressed in a color space defined by one or more color channels, such as gray level, RGB, CMYK, L*a*b*, or the like. Color-based features can refer to any aspect of color which may be specified, including, but not limited to, absolute color values, such as hue, chroma, and lightness, and relative color values, such as differences in hue, chroma, and lightness, which may be expressed as color gradients.

In the case of text documents, the features can be based on extracted words or subparts of words. In the case of audio files, the features may be based on phonemes or the like. Representations of objects comprising two or more modalities, such as a representation of both the audio and video portion of a movie, are also contemplated.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

In the illustrated embodiments, the objects are described in terms of images. However, it is to be appreciated that the disclosed classifier training method and training system and classifier system developed therefrom can be employed in conjunction with other types of objects, such as speech segments or text documents.

Figure 1:
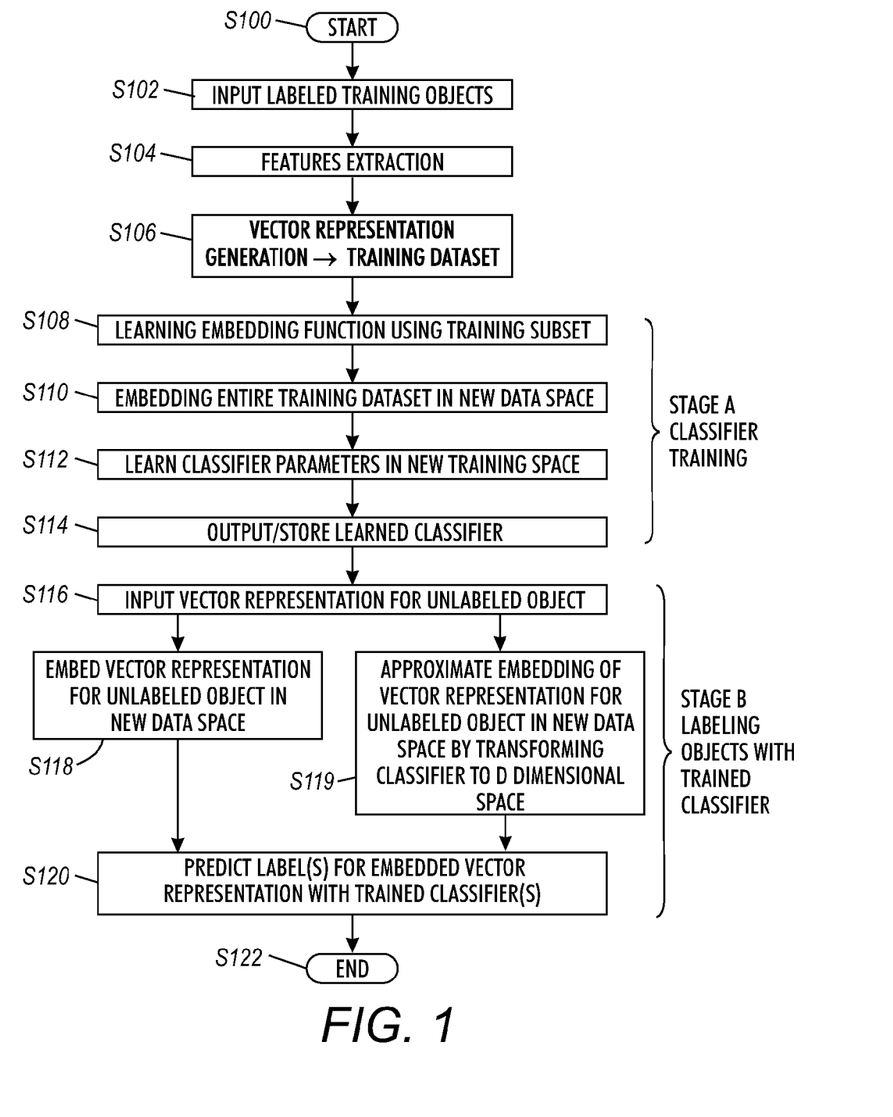
FIG. 1 is a flow diagram illustrating a method of training and using a classifier in accordance with one aspect of the exemplary embodiment.

With reference to FIG. 1, a computer-implemented method in accordance with the exemplary embodiment includes a classifier training stage, in which parameters of a linear classifier are learned from a labeled training set, and a classifier utilization phase, in which the trained classifier is used in a computer-implemented method which includes predicting labels of unlabeled objects. The method, details of which are described in greater detail below, begins at S100.

At S102, a training set S of a number N of labeled training objects is input and stored in computer memory.

At S104, features are extracted from the training objects in the training set.

At S106, an object representation in the form of a first multi-dimension vector (sample vector) is generated for each object in a first multi-dimension vector space.

At training time (stage A), the following steps are performed:

At S108, per dimension embedding functions $\phi_d$ are learned for embedding the object representations into a new, multi-dimension data space of the same or higher dimensionality. This step may be performed with a subset $S_1$ of the training samples containing a smaller number K of the samples.

Assuming that only a subset $S_1$ of the training set S has been used in S108, then at S110, the entire training set S is embedded in the new multi-dimension data space using the learned embedding functions $\phi_d$.

At S112, a linear classifier is trained on the embedded training set. Specifically, parameters of at least one linear classifier are learned in the new multi-dimension data space based on the embedded training set. This corresponds to a non-linear decision function in the original multi-dimension data space. This completes the classifier training stage A.

At S114, the trained classifier may be output and/or stored in memory.

At S116, at test time (stage B), a test object (e.g., an image) is input. Given a test sample x (a vector representation for the input (unlabeled) image), the test sample x may be embedded in the new multi-dimension data space at S118.

At S120, the trained classifier(s) is used to predict the test sample's label(s), based on the embedded vector.

The embedding at step S118 may be performed analogously to the embedding of the labeled samples at S110, by using the learned embedding functions. In an alternative embodiment, an approximate embedding is performed. Specifically, at S119, the trained linear classifier is transferred back to the original, multi-dimensional space and applied directly to the input vector. As will be appreciated one or more of the steps described above may be performed with the aid of a digital processor.

The method ends at S122.

As will be appreciated, steps S104 and S106 can be performed by any conventional methods for obtaining a unique signature for an object which includes less data than the original object. Examples of methods for deriving signatures include those described in any one of above mentioned U.S. Pub. Nos. 2007/0005356; 2007/0258648; 2008/0069456; 2009/0144033; and U.S. Ser. No. 12/252,531. In one embodiment, the object representations may be generated elsewhere and a training set of labeled vectors input in place of the objects themselves.

Steps S102-S106 thus provide a training set $S=\{(x_i,y_i) i=1 \ldots N\}$, where each $x_i$ is a D-dimensional vector in an original multi-dimension data space and each $y_i$ is its label, selected from a set of two (or more) class labels. D, the number of dimensions in each vector, can be large, such as at least 50 or at least 100, e.g., at least 1000. In the exemplary embodiment, all the training vectors have the same number D of dimensions.

As disclosed herein, a non linear classifier for classifying a D dimensional vector can be approximated by a linear classifier operating in a new multi-dimensional space which is of the same or higher dimensionality than the original space. For example, the new multi-dimension space is a DE dimensional space, where E is an integer $\geq 1$. For example, E may be 1 or at least 2, and in one embodiment, at least 3. In some embodiments, E is up to 50 or up to 20, e.g., E can be from 5 to 10. Thus for example, when D is 50 and E is 1, the original and new multi-dimension spaces are the same, having a dimensionality of 50. When D is 50 and E is 5, for example, the dimensionality of the new multi-dimension space is 250. In the exemplary embodiment, E is a constant value for all dimensions D. However, it is also contemplated that E may be variable over D, such that E is not the same number for each dimension of D. For example, E could be 1 for the first dimension of D, 10 for the second dimension, 2 for the third and fourth dimensions, and so forth. In various embodiments, the exemplary linear classifier can be trained more efficiently in the new space than the non-linear kernel classifier in the original space.

As discussed in greater detail below, a dimensionwise mapping is performed such that a D-dimensional vector x, is mapped to a DE-dimensional vector $\phi(x)$, and the mapping $\phi_d(x[d])$ for each dimension d is selected such that the kernel between corresponding dimension values of two D-dimensional vectors (e.g., two of the training vectors a and b) in the first multi-dimension space is approximated by a dot product between the mapped scalar values (where E=1) or vectors (where E is greater than 1) in the second multi-dimension space. In other words, using $k(a,b)$ to represent the kernel between dimension values of vectors a, b, the approximation $k(a,b) \approx \phi(a) \cdot \phi(b)$ holds (where • denotes a dot product). As a result, computationally intensive kernel classification training may be replaced by more efficient linear classification training, while retaining the operational advantages of the kernel classifier.

As will be appreciated from the foregoing, when the first and second multi-dimension spaces have the same number of dimensions (where E is 1 for each dimension, then DE=D), the embedded vector in the second multi-dimension space is not simply a scaled version of the original vector since each dimension has its own embedding function $\phi_d$ and at least some or all the embedding functions are different from each other. Where E>1 for one or more of the dimensions, then the second multi-dimension space has a higher number of dimensions than the original, first multi-dimension space.

Figure 2:
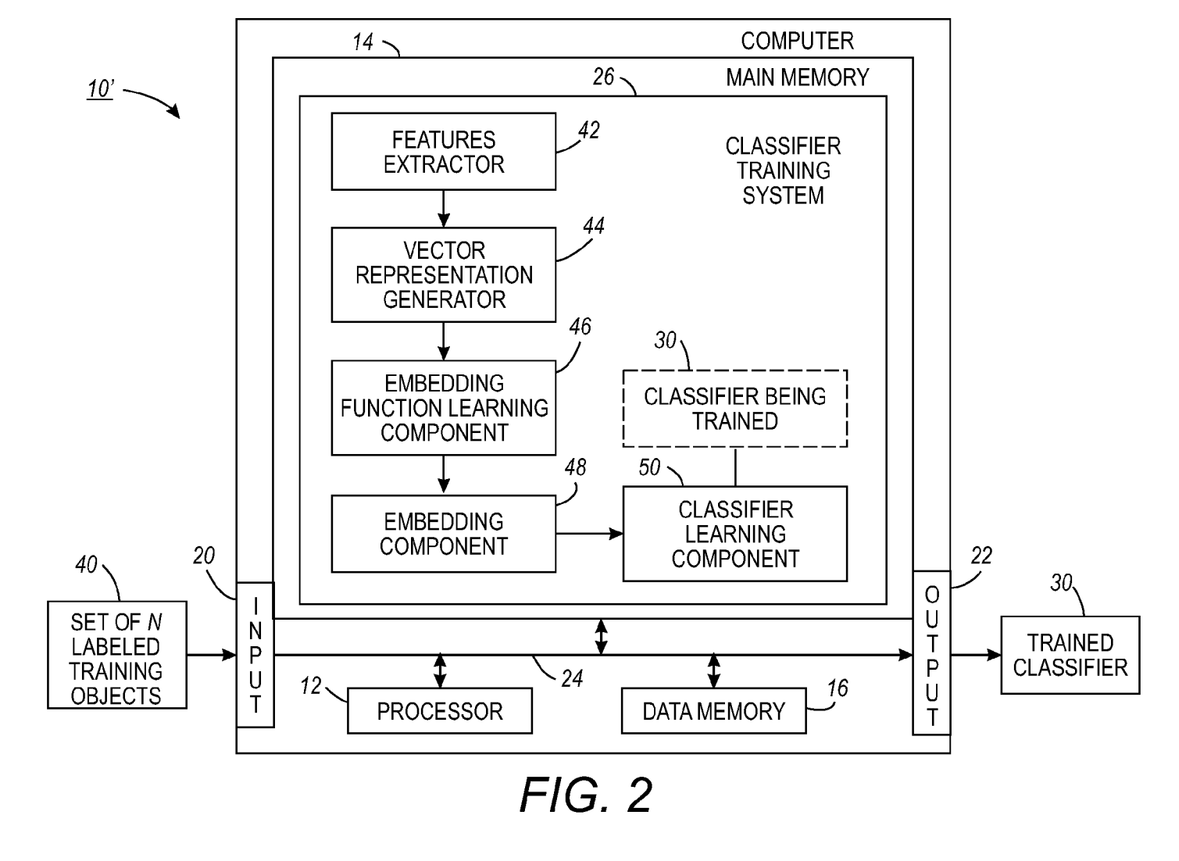
FIG. 2 is a functional block diagram of a classifier training system in accordance with another aspect of the exemplary embodiment.
Figure 3:
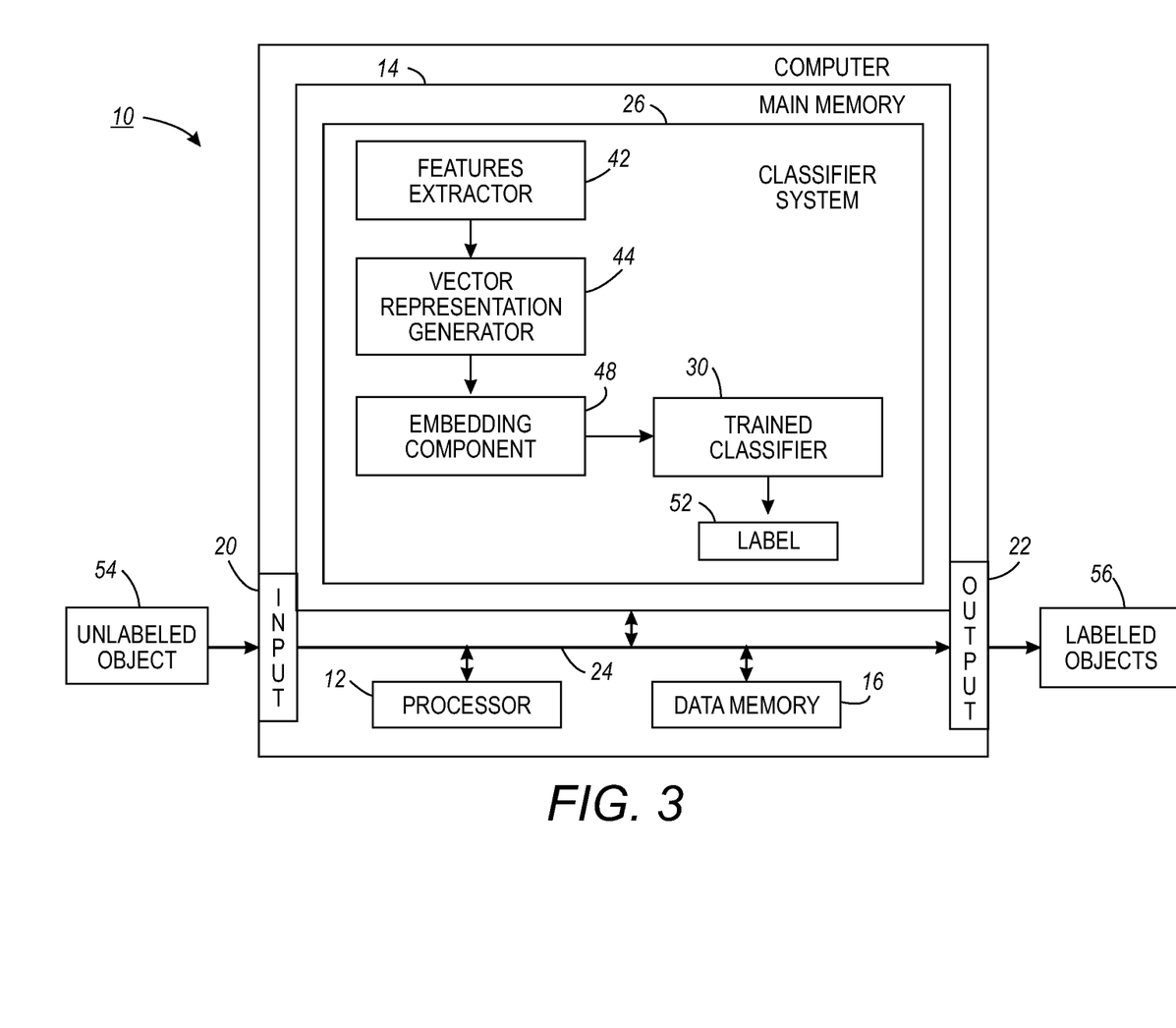
FIG. 3 is a functional block diagram of a classifier system trained in accordance with the method shown in FIG. 1, in accordance with another aspect of the exemplary embodiment.

With reference to FIG. 2, a system for training a classifier in accordance with the exemplary method of FIG. 1 is illustrated, embodied in a computing apparatus. FIG. 3 illustrates a system for using the classifier trained in the apparatus of FIG. 2, which may be similarly configured, except as noted below.

As illustrated in FIG. 2, the classifier training apparatus includes a computer 10 or other digital processing device that includes a digital processor 12, such as the computer's CPU, and associated memory, here illustrated as main memory 14 and data memory 16. The digital processor 12 can be variously embodied, such as by a single-core processor, a dual-core processor (or more generally by a multiple-core processor), a digital processor and cooperating math coprocessor, a digital controller, or the like. The computer 10 may include one or more dedicated or general purpose computing devices, such as a server computer or a desktop or laptop computer with an associated display device and a user input device, such as a keyboard and/or cursor control device (not shown).

The memories 14, 16 may be separate or combined and may represent any type of computer readable medium such as random access memory (RAM), read only memory (ROM), magnetic disk or tape, optical disk, flash memory, or holographic memory. In one embodiment, the memory 14, 16 comprises a combination of random access memory and read only memory.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated computer 10 includes an input interface 20 and an output interface 22, which may be combined or separate. Interface 20 receives training objects and/or their computed vector representations. Interface 22 outputs a trained linear classifier and/or its parameters. Or, in the case where the same apparatus is used for training and classification, may output label predictions for input test samples. Exemplary input and output interfaces include wired and wireless network interfaces, such as modems, or local interfaces, such as USB ports, disk drives, and the like. Components 12, 14, 16, 20, 22 of the computer are communicatively interconnected by a data/control bus 24.

The computer 10 is configured by suitable programming or hardwired firmware to embody a classifier training system 26 as diagrammatically represented in FIG. 2 and/or to embody a classifier system 28 employing a classifier 30 trained using the classifier training system 26, as represented in FIG. 3. While both of these aspects may be combined in a single computing device 10, in FIG. 3, the trained classifier 30 is shown incorporated into a separate computing device 10' specifically configured for use of the classifier as a predictor of labels for unlabeled objects.

The method illustrated in FIG. 1 may be implemented in a computer program product or products that may be executed on a computer. The computer program product may be a computer-readable recording medium on which a control program is recorded, such as a disk, hard drive, or the like configured for performing at least stage A and/or B of the method. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. The computer program product may be integral with the computer 10, 10' (for example, an internal hard drive or RAM), or may be separate (for example, an external hard drive operatively connected with the computer 10, 10'), or may be separate and accessed via a digital data network such as a local area network (LAN) or the Internet (for example, as a redundant array of inexpensive or independent disks (RAID) or other network server storage that is indirectly accessed by the computer 10, 10' via a digital network). Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 1, can be used to implement the method for training and/or using the trained classifier described herein.

With reference once more to FIG. 2, the classifier training system 26 operates on a training set S comprising a suitable number N of labeled training images 40. The labels represent a priori information about the classifications of the images, such as manually applied class labels. For a hard binary classification, the labels can, for example, be "+1" if the training image is assigned to the class and "−1" otherwise. For a soft binary classification, the labels can, for example, be values in the range [0,1] indicating likelihood of membership in the class.

The N training images (or, more generally, the N training objects) are processed by a features extractor 42, which extracts low level features from the images, and a vector representation generation module 44, which generates a corresponding N training samples based on the extracted features, each training sample comprising a representative vector with a dimensionality D. In one embodiment, the vector representation generation module 44 generates Fisher vectors, which can be used as vector representations for images. Other vector representations can alternatively be employed, such as a "bag-of-visual-words" vector representation. The N representative vectors are labeled with the classification information of the corresponding N training images 40. The classifier learning system 26 includes an embedding function learning component 46, which, for each of the D dimensions, learns an embedding function for embedding the vectors in a new multi-dimensional space. In the exemplary embodiment, the learning of these functions is performed using a subset of the training samples. The learned embedding functions are then used by an embedding component 48 to embed all the vectors in the new multi-dimension space. The embedded vectors are input to a classifier training module 50. The classifier training module 50 learns values of the classifier parameters using the N labeled embedded representative vectors as a training set in order to generate a trained linear classifier 30.

The training approach disclosed herein and employed by the classifier training module 26 trains a linear classifier 30 which can then be utilized in the system of FIG. 3 to predict labels 52 for unlabeled images 54. As for the system of FIG. 2, representative vectors in the first multi-dimension space are extracted from the unlabeled images and embedded in the second (e.g., higher) multi-dimensional space using an embedding component 48. The embedding component may be configured as for the embedding component 48 of FIG. 2, or may be modified to allow an approximate embedding to be performed, which does not require direct use of the embedding functions. The embedded vectors are input to the trained classifier 30 and the classifier predicts a label 52 for each test image 54. The output of the system of FIG. 3 may be a labeled image 56. As noted above, the label 52 may be a hard label or a soft label. The trained linear classifier 30 can have an accuracy that is characteristic of nonlinear classifiers, but without the computational expense.

Further details of the method and system now follow. By way of background, a brief overview of linear and non-linear classifiers is first provided, followed by details specific to the exemplary embodiments.

Linear Classification

In the following, for simplification, a two-class decision problem is considered, although it is to be appreciated that the exemplary method is applicable to multi-class decision problems. The set of N labeled training samples is represented by $\{(x_i, y_i), i=1, \ldots, N\}$ where each training vector $x_i$ is a D-dimensional vector and each $y_i \in \{-1, +1\}$ is a binary label.

The exemplary embodiment uses linear classification for predicting a label y to assign to a test sample x, where x is a D-dimensional vector.

In the conventional linear classification training stage, the goal is to learn a predictor $\hat{y}$ of the form:

$$\hat{y}(x) = a^T x + b \quad (1)$$

where a is a D dimensional vector of parameters, b is an offset parameter, and T denotes the transposition operator. Learning the parameters a and b may be achieved by minimization of a risk function which is the sum of:

1. an empirical risk, $R_{emp}$:

$$R_{emp} = \frac{1}{N} \sum_{i=1}^{N} l(\hat{y}_i, y_i) \quad (2)$$

where $l(\hat{y}_i, y_i)$ is a function which measures the loss incurred from predicting $\hat{y}_i = \hat{y}(x_i)$ while the true label was $y_i$. Typical losses include the hinge loss used in Support Vector machine (SVM) classification:

$$l_{hinge}(\hat{y}_i, y_i) = \max(0, 1 - \hat{y}_i y_i) \quad (3)$$

or the log-loss used in logistic regression:

$$l_{log}(\hat{y}_i, y_i) = \log(1 + \exp(-\hat{y}_i y_i)) \quad (4)$$

2. a regularization risk, $R_{reg}$ which penalizes the norm of a. Typical regularization terms include $L_2$ penalization:

$$R_{reg} = \frac{\lambda}{2} \|a\|_2^2 \quad (5)$$

and $L_1$ penalization:

$$R_{reg} = \lambda \|a\|_1 \quad (6)$$

where $\lambda$ is the regularization parameter, which may be set for example, through cross-validation.

Combining the log-loss with the $L_1$ penalization leads to Sparse Logistic Regression (SLR):

$$\frac{1}{N} \sum_{i=1}^{N} l_{log}(a^T x_i + b, y_i) + \lambda \|a\|_1 \quad (7)$$

The parameters a and b can thus be found by minimizing Eqn. (7) over all values of N.

As described in greater detail below, in the exemplary embodiment, a represents a D×E dimensional vector where DE represents the number of dimensions in the second multi-dimension space, and where E can be a selectable parameter which is optimized to provide improved classification over the D dimensional case, recognizing that at some point, the added slight improvement of an increase in E may not be justified in terms of the added computational cost. Moreover, while Eqn. 7 is expressed in terms of $x_i$, it will be appreciated that in the present case, when E>1, a vector embedded in the second, higher multi-dimension space is used as $x_i$.

While the exemplary embodiment is described in terms of Sparse Linear Regression (SLR) as the method for learning the parameters of the linear classifier, it is to be appreciated that any other linear classifier may be employed, such as Sparse Multinomial Logistic Regression (e.g., for a classifier which classifies into more than two classes), standard logistic regression classifier (omitting the $\lambda \|a\|_1$ term), linear support vector machine (SVM) classifier, or the like. See, e.g., B. Krishnapuram, L. Carin, M. Figueiredo, and A. Hartemink. Sparse multinomial logistic regression: Fast algorithms and generalization bounds. *IEEE PAMI*, 27(6):957-968, 2005.

One advantage of SLR compared to other alternatives is that it leads to a sparse vector a, i.e., it performs simultaneous classification and feature selection. In general, linear classifiers are very fast to learn and to evaluate but their classification accuracy can be limited. In the present embodiment, by embedding the samples where the dot product approximates the kernel in the original space, and optionally increasing the dimensionality, accuracy approaching that of kernel classification can be achieved, even with relatively small values of E, such as less than 20, e.g., from 1-10, although higher values of E may be appropriate in some circumstances. In the case when E is 1, for example, the dot product merely becomes the product.

Kernel Classification

By way of comparison, in kernel classification, it is assumed that a kernel $k:(.,.) \mathbb{R}^D \times \mathbb{R}^D \to \mathbb{R}$ exists, which measures a reasonable similarity between the sample vectors. In kernel learning, the goal is to learn a predictor $\hat{y}$ of the form:

$$\hat{y}(x) = \alpha^T k(x) + \beta \quad (8)$$

where $\alpha$ is an N-dimensional vector of parameters, $\beta$ is an offset parameter and $k(x) = [k(x, x_1), \ldots, k(x, x_N)]$ is the N-dimensional vector of similarities between x and all training samples. As is the case for linear classification, learning the parameters $\alpha$ and $\beta$ typically requires the minimization of a risk function which is the sum of an empirical risk term and a regularization term. For example, SLR can be used for kernel classification and the object is to minimize:

$$\frac{1}{N} \sum_{i=1}^{N} l_{log}(\alpha^T k(x_i) + \beta, y_i) + \lambda \|\alpha\|_1 \quad (9)$$

As SLR leads to a sparse solution, only a small number of training vectors $x_i$ are needed for classification (as is the case for the SVM for instance).

Kernel classifiers typically lead to a significant increase in classification accuracy compared to simpler linear classifiers. However, computing the kernel matrix (i.e., the N×N matrix whose entries are the $k(x_i, x_j)$ values) requires $O(N^2 D)$ operations. Hence, the cost of learning becomes prohibitive for a large number of training samples N.

Learning a Linear Classifier

The exemplary method focuses on the case where a kernel k between input training samples (vectors) can be decomposed as a sum over the D dimensions of the similarity w between the pair of sample vectors in each dimension d:

$$k(x_i, x_j) = \sum_{d=1}^{D} w(x_i[d], x_j[d]) \quad (10)$$

with $w: \mathbb{R} \times \mathbb{R} \to \mathbb{R}$. This includes the $\chi^2$ kernel:

$$w(u, v) = \frac{2uv}{u + v}, \quad (11)$$

where u and v are variables (e.g., $x_i[d]$ can be used for u and $x_j[d]$ for v).

$$w(u, v) = \frac{1}{2}(|u| + |v| - |u - v|), \quad (11A)$$

used in the Example below;

or the intersection kernel:

$$w(u, v) = \min(u, v) \quad (12)$$

For a training set which can be approximated by kernels of the type shown in Eqn. (10), the present method allows a two-step approach:

1. Learning an embedding of the data in a second multi-dimension space of the same or higher dimensionality (S108). This embedding is obtained by computing dimension-wise embeddings and concatenating them. Here, E is the size of the dimension-wise embeddings. The dimension of the global embedding is therefore DE. The embeddings are chosen such that the kernel between two points in the original space is approximately equal to a dot product in the new space. A suitable value of E can be selected which optimizes accuracy of the classifier according to an assessment metric, such as average precision. In other embodiments, E is allowed to vary for each dimension between minimum and maximum values.

2. Learning a linear classifier directly in the new space (S110). This corresponds to a non-linear decision function in the original space.

The cost of learning the linear classifier in the new multi-dimension space is in O(NDE). The cost of classifying a new sample is in O(DE). The learning the embedding and learning the linear classifier in the new space can be performed as follows.

Embedding:

In S108 and S110, the training vectors are transformed into vectors in the new multi-dimension space, which is referred to herein as embedding. A first step of the embedding procedure (S108) is to find a set of functions $\phi_d: \mathbb{R} \to \mathbb{R}^E$ (one per dimension, d) such that similarity between two vectors in the original (e.g., lower) multi-dimension space can be approximated as a dot product of the embedding function which embeds in the new multi-dimension space:

$$w(x_i[d], x_j[d]) \approx \phi_d(x_i[d]) \cdot \phi_d(x_j[d]), \forall (i,j) \quad (13)$$

Each $\phi_d$ is a function which turns a scalar value into a scalar (when E=1) or a vector (when E>1).

Then let the embedding function for dimension d of sample x be denoted as $\phi_d(x)=[\phi_{d,1}(x), \ldots, \phi_{d,E}(x)]$, where $\phi_{d,e}: \mathbb{R} \to \mathbb{R}$ e=1 ... E. The embedding can be performed using Eigenvalue decomposition as follows:

Eigenvalue Decomposition:

Eqn. (13) can be formalized as follows. It can be assumed that the samples $\{x_i[d], i=1 \ldots N\}$ were drawn from a distribution $p_d$. Let u and v be two iid random variables that follow $p_d$. Then, seek the function $\phi_d$ that minimizes the following cost:

$$\int_{u,v} (w(u,v) - \varphi_d(u)^T \varphi_d(v))^2 p_d(u) p_d(v) du dv \quad (14)$$

under the constraint:

$$\int_{u,v} \varphi_{d,e}(u) \varphi_{d,f}(u) p_d(u) = 0 \text{ for } e \neq f \quad (15)$$

The constraint in Eqn. (15) translates the fact that the output dimensions of $\phi_d$ should be uncorrelated. Minimizing Eqn. (14) under the constraint of Eqn. (15) is equivalent to maximizing:

$$\int_{u,v} w(u,v) \varphi_d(u)^T \varphi_d(v) p_d(u) p_d(v) du dv \quad (16)$$

under the same constraint. When an analytical formula is available for w (which is true in this case) and $p_d$ (which is not true in all cases), it may be possible to find a closed-form formula for $\phi_d$ (see, for instance, Y. Weiss, A. Torralba, and R. Fergus. Spectral hashing. In *NIPS, 2008*). In the other case, a standard procedure is to use directly the set of samples $\{x_i[d], i=1 \ldots N\}$ and to replace the previous problem by the maximization of:

$$\sum_{i=1}^{N} \sum_{j=1}^{N} w(x_i[d], x_j[d]) \varphi_d(x_i[d])^T \varphi_d(x_j[d]) \quad (17)$$

under the constraint:

$$\sum_{i=1}^{N} \varphi_{d,e}(x_i[d]) \varphi_{d,f}(x_i[d]) = 0 \text{ for } e \neq f \quad (18)$$

This is a standard eigenvalue/eigenvector problem. Let $W_d$ denote the N×N matrix whose entries are $w(x_i[d], x_j[d])$. Let $\sigma_{d,e}^2$ be the e-th largest eigenvalue of $W_d$ (which is non-negative by definition if w is a Mercer kernel) and let $\psi_{d,e}$ be its associated eigenvector. Then:

$$\phi_{d,e}(x_i[d]) = \sigma_{d,e} \psi_{d,e}[i] \quad (19)$$

To extend $\phi_{d,e}$ to a new sample x, the Nyström approximation can be used:

$$\varphi_{d,e}(x_i[d]) = \frac{1}{\sigma_{d,e}} \sum_{i=1}^{N} w(x[d], x_i[d]) \psi_{d,e}[i] \quad (20)$$

In the following, let $\phi(x)$ denote the DE dimensional embedding of the full vector x, which is obtained by concatenating the embeddings of each dimension:

$$\phi(x)=[\phi_{1,1}(x[1]), \ldots, \phi_{1,E}(x[1]), \ldots, \phi_{D,1}(x[D]), \ldots, \phi_{D,E}(x[D])] \quad (21)$$

Combining Eqns. (10) and (13) leads to:

$$k(x_i, x_j) \approx \phi(x_i)^T \phi(x_j) \quad (22)$$

Cost Reduction

The cost of computing the embeddings of the N training samples, which is dominated by the cost of the eigenvalue decompositions, is in O(DEN²). Also, the cost of embedding a new point using the Nyström approximation (Eqn. (20)) is in O(DEN). Therefore, without additional measures to reduce the embedding cost, the cost of the exemplary method is higher than a conventional kernel classification by a factor E. However, it is possible to reduce the embedding cost significantly using two approximations.

In the first approximation, not all training samples are used to compute the $\phi_{d,e}$ functions with good accuracy. In practice, a small set of K subsamples (K<<N) is sufficient for a good approximation because the Nyström approximation is applied in 1D. As an example, N may be at least ten times K. In the example below, N=5,011 and K=100. Moreover, as N increases, it is not necessary to increase K proportionately. For example, K may remain constant, e.g., at about 100. The cost of the eigenvalue decompositions using this approximation is in O(DEK²) and the cost of embedding an out-of-sample point is in O(DEK).

A second approximation is to split each of the D dimensions into a set of B bins (for example, by regularly sampling the interval between the smallest and the largest observed values in the training set) and pre-computing offline the BED Nyström approximations $\phi_{d,e}(c_{d,b})$ at each bin center $c_{d,b}$ for: d=1 ... D, e=1 ... E and b=1 ... B. Given a new sample x, $\phi(x)$ can then be computed using either a piecewise-constant or a piecewise-linear approximation of the $\phi_{d,e}$ functions. Hence, the cost of computing the embedding for a new sample is in O(DE). As for the storage cost, it is in O(DEB).

Linear Classification in the New Space

Having learnt the linear classifier 30 by the method outlined in S108-S112, a new sample x is classified by the classifier as follows. In one embodiment, an embedding $\phi(x)$ of the vector x into a D×E dimensional space is performed as described for S110 above. As the parameters E, K and B increase, the approximation of the kernel k as a dot product: $k(x_i, x_j) \approx \phi(x_i)^T \cdot \phi(x_j)$ becomes better and better. Combining Eqns. (8) and (22) leads to:

$$\hat{y}(x) \approx \sum_{i=1}^{N} a_i \varphi(x)^T \varphi(x_i) + b \quad (23)$$

$$= \varphi(x)^T \left( \sum_{i=1}^{N} a_i \varphi(x_i) \right) + b \quad (24)$$

This simply shows that the prediction $\hat{y}(x)$ is approximately a linear classifier in this new multi-dimension space. Hence, instead of learning a kernel classifier in the original space, the exemplary method in which a linear classifier is directly learnt in this new space as explained above, gives a close approximation to the accuracy of learning a kernel classifier. The linear classifier in the new multi-dimension space, will result in a nonlinear classifier in the original space.

It can be noted that, even if $\phi$ does a perfect job at approximating the non-linear kernel k, learning a linear classifier in the new space is a different problem than learning a kernel classifier in the original space. Indeed, in the former problem there are E×D+1 parameters to be learned while in the latter one there are N+1. Hence, there is no guarantee that the corresponding solutions are equivalent, i.e., that the resulting classifier in the original space is the same. However, comparison tests show that the output label accuracies are quite similar.

In another embodiment, at test time, the explicit embedding in the new multi-dimension space can be avoided, by an approximate embedding, as follows. By definition:

$$\varphi(x)^T \varphi(x_i) = \sum_{d=1}^{D} \sum_{e=1}^{E} \varphi_{d,e}(x[d]) \varphi_{d,e}(x_i[d]) \quad (25)$$

Therefore Eqn. (24) can be rewritten as:

$$\hat{y}(x) \approx \sum_{d=1}^{D} \xi_d(x[d]) + b \quad (26)$$

where $\xi_d$ is defined as:

$$\xi_d(x[d]) = \sum_{i=1}^{N} a_i \sum_{e=1}^{E} \varphi_{d,e}(x[d]) \varphi_{d,e}(x_i[d]). \quad (27)$$

The $\xi_d$ functions can be tabulated, e.g. by splitting the D dimensions into a set of B bins and computing for each bin center $c_{d,b}$ the value $\xi_d(c_{d,b})$. This avoids the explicit embedding of the vector x in the new space and makes the classification cost in O(D) instead of O(DE).

Summary

In summary, an algorithm for performing the exemplary method at training and test time has been described. Briefly, at training time, given a training set $\{(x_i, y_i), i=1 \ldots N\}$:

a) Learn the embedding functions $\phi_d$ per dimension using a subset of samples.
b) Embed all the training points in the new, e.g., higher, multi-dimensional space.
c) Learn a linear classifier in the new space.

At test time, given a test sample x:

d) Embed x in the new space as for b) (S118), or use an alternate method for approximate embedding in the new space by returning the classifier to the original dimension D (S119).
e) Use the linear classifier as a label predictor in the new space.

Without intending to limit the scope of the exemplary embodiment, the following Example describes one implementation of the exemplary method.

EXAMPLE

The exemplary learning algorithm was validated on an image categorization benchmark. As the dataset, the standard PASCAL VOC 2007 image set was used for evaluation. This dataset contains 5,011 training images and 4,952 test images. Although this is quite a small dataset, it can be seen that substantial cost savings can be obtained at learning and test time compared to a kernel classifier. The dataset consists of 20 categories: person, bird, cat, cow, dog, horse, sheep, airplane, bicycle, boat, bus, car, motorbike, train, bottle, chair, dining table, potted plant, sofa and TV monitor. Performance is measured using the average precision (AP). In the table below, the mean AP over the 20 categories is reported.

As the image representations, two types of image signatures were evaluated: bag-of-visual-words (BoV) signatures (see, J. Sivic and A. Zisserman. Video google: A text retrieval approach to object matching in videos. In *IEEE ICCV*, 2003; and G. Csurka, C. Dance, L. Fan, J. Willamowski, and C. Bray. Visual categorization with bags of keypoints. In *ECCV Workshop on Statistical Learning for Computer Vision*, 2004) and Fisher kernel (FK) signatures (see, F. Perronnin and C. Dance. Fisher kernels on visual vocabularies for image categorization. In *IEEE CVPR*, 2007). In the following, only results with FK are reported as it always outperformed the BoV. The FK signatures used in these experiments are 3,200-dimensional. In the case of Fisher gradient vectors, a good dimension-wise measure of similarity w is:

$$w(u, v) = \frac{1}{2}(|u| + |v| - |u - v|) \quad (28)$$

In the case of non-negative vectors (which is not the case for the Fisher gradient vector), this simplifies to min(u, v) and the measure becomes the intersection kernel. Note that it can be shown that the similarity of Eqn. (28) is a Mercer kernel, even in the case of positive and negative values. SLR was used for classification. 20 classifiers (one per class) were trained in a one-versus-all manner.

Table 1 shows the results obtained for the present method as well as two baselines: (i) "Linear" using SLR in the original space and (ii) "Kernel" using kernel SLR in the original space with an intersection kernel (as described above). As expected, the performance of kernel SLR is significantly higher than that of Linear SLR (+7.7% absolute). Two variations of the exemplary algorithm were evaluated: an "Exemplary-slow" version based on "exact" Nyström extension (see Eqn. (20)) and an "Exemplary-fast" version based on a piecewise-constant approximation of the eigenvalue functions with precomputed values (also based on the Nyström extension). In both cases, K=100 samples was used for the Nyström computation. For the fast approach, each dimension was split into B=256 regularly spaced bins. It can be see that the performance of the exemplary method increases as expected with the number E.

The best result is 49.7% with the slow and fast approaches. This is significantly higher than for the baseline linear classifier, but still somewhat behind the best results obtained with the kernel classifier. However, it should be noted that for E=5, the exemplary system has to learn 5×3200=16,000 parameters, while for the kernel approach, it has to learn only 5,011 parameters. It is to be expected that the performance of the present system would come closer to the performance of the kernel approach as the number of samples increases.

In terms of computational cost, learning the classifier takes approximately 2.4 seconds per class for the linear baseline, 344 seconds for the kernel baseline (340 seconds to compute the kernel matrix and 4.1 seconds to learn the parameters), 11.5 seconds for the exemplary slow approach with E=5 (approximately 6.8 seconds for the embedding and 4.7 seconds to learn the classifier parameters) and 4.7 seconds for the exemplary fast approach with E=5 (the embedding cost is negligible in this case). Testing the classifier on a new sample takes approx. 85 μs for the linear classifier, 70 ms for the kernel classifier, 1.8 ms for the exemplary slow approach and 0.4 ms for the exemplary fast approach (using the method for determining y without embedding as outlined in Eqns. (26) and (27)). Hence, the learning and testing costs of the proposed method are much smaller than that of the kernel approach.

TABLE 1

Performance of two baseline systems and the exemplary methods in terms of mean AP.

| Method | | Mean AP (%) |
| --- | --- | --- |
| Baseline | Linear | 43.5 |
| | Kernel | 51.2 |
| Exemplary-Slow | E = 1 | 46.1 |
| | E = 3 | 49.5 |
| | E = 5 | 49.7 |
| | E = 10 | 49.6 |
| Exemplary-Fast | E = 1 | 46.0 |
| | E = 3 | 49.5 |
| | E = 5 | 49.7 |
| | E = 10 | 49.7 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims

What is claimed is:

1. A classifier training method comprising:
providing a set of training samples each training sample comprising a training vector in a first multi-dimension space representative of an object and a class label for the object;
for at least a subset of the training samples, deriving a set of embedding functions for embedding training vectors that are in the first multi-dimension space into a second multi-dimension space of higher dimensionality than the first multi-dimension space, the embedding functions comprising one embedding function for each dimension of the first multi-dimension space;
with the embedding functions, generating a set of embedded vectors in the second multi-dimension space corresponding to the training vectors;
with a computer processor, training a linear classifier on the set of embedded training vectors and their class labels to generate a trained linear classifier operative in the second multi-dimension space for predicting labels for unlabeled sample vectors.

2. The method of claim 1, wherein each embedding function is selected such that for each dimension of the first multi-dimension space, similarity between two training sample vectors in said dimension is approximated as a dot product of respective embedding functions of the training sample vectors which embed said dimension in the second multi-dimension space.

3. The method of claim 1, wherein the second multi-dimension space is of higher dimensionality than the first multi-dimension space.

4. The method of claim 1, wherein in deriving a set of embedding functions, in each dimension d, an embedding function $\phi_d$ that maps a scalar value x[d] of a training vector x into a new space with E dimensions is learnt, $\phi_d$ being selected such that in this new space, the dot product between $\phi_d(x_i[d])$ and $\phi_d(x_j[d])$, approximates the kernel $w(x_i[d],x_j[d])$ where $x_i[d]$ represents a value of a first vector in dimension d and $x_j[d]$ represents a value of a second vector in dimension d in the first multi-dimension space.

5. The method of claim 1, wherein each training vector is derived from an object selected from the group consisting of an image, a video, a text object, an audio object and combinations and multiples thereof.

6. The method of claim 1, wherein the generating of the set of embedded vectors comprises for each training vector, concatenating a computed value for each dimension in the second multi-dimension space.

7. The method of claim 1, wherein each embedding function converts a scalar value for a respective dimension of a sample vector in the first multi-dimension space into a vector having at least one dimension.

8. The method of claim 7, wherein at least some of the embedding functions convert a scalar value for a respective dimension of a sample vector in the first multi-dimension space into a vector having a plurality of dimensions.

9. The method of claim 1, wherein the deriving of the embedding functions includes eigenvalue decomposition.

10. The method of claim 1, wherein the trained linear classifier operative in the second multi-dimension space corresponds to a non-linear classifier in the first dimensional space.

11. The method of claim 1, further comprising predicting a label for an unlabeled sample vector with the trained classifier, including embedding the unlabeled sample vector in the second multi-dimension space.

12. The method of claim 1, wherein a Nyström approximation is used to embed samples to be labeled by the classifier in the second multi-dimension space.

13. The method of claim 1, wherein the deriving a set of embedding functions includes partitioning the dimensions of the first multi-dimension space into a set of bins and computing an embedding function for each bin.

14. The method of claim 1, wherein the first multi-dimension space comprises at least fifty dimensions.

15. The method of claim 1, further comprising generating each of the training vectors in the first multi-dimension space by extracting features from an object and deriving the training vector from the extracted features.

16. The method of claim 1, wherein the number of dimensions in the first multi-dimension space is represented by D and the number of dimensions in the second multi-dimension space is represented by ED.

17. The method of claim 16, further comprising selecting a value of E which optimizes accuracy of the classifier according to an assessment metric.

18. The method of claim 16, wherein E is at least 2.

19. The method of claim 16, wherein E is up to 20.

20. The method as set forth in claim 1, further comprising: generating the set of training vectors and the sample vector from images.

21. A computer program product encoding instructions, which when executed on a computer causes the computer to perform the method of claim 1.

22. A classification system comprising memory which stores a linear classifier formed by the method of claim 1 and a processor, in communication with the memory, which executes instructions for inputting samples to be classified into the classifier.

23. An apparatus for approximating a non-linear classifier in a first multi-dimension space by training a linear classifier in a second multi-dimension space, the apparatus comprising:
   memory which stores instructions which:
      for at least a subset of an input set of training samples, each training sample in the set comprising a training vector in the first multi-dimension space and a class label, derive a set of embedding functions for embedding each of the training vectors that are in the first multi-dimension space into the second multi-dimension space, the embedding functions comprising one embedding function per dimension of the first multi-dimension space,
      with the embedding functions, generate a set of embedded vectors in the second multi-dimension space corresponding to the training vectors, and
      train a linear classifier on the set of embedded training vectors and their class labels to generate a trained linear classifier operative in the second multi-dimension space for predicting labels for unlabeled test sample vectors; and
   a processor in communication with the memory for executing the instructions.

24. The apparatus of claim 23, further comprising:
   instructions for converting a test sample vector in the first multi-dimension space to a vector in the second multi-dimension space without using the embedding functions.

25. A classification apparatus comprising:
   memory which stores a linear classifier configured for classifying a test sample vector input in a first multi-dimension space, the classifier operating in a second multi-dimension space of the same or higher dimensionality than the first multi-dimension space;
   instructions for embedding an input test sample vector into the second multi-dimension space and for classifying the embedded vector with the linear classifier, the embedding instructions including:
      for each of D dimensions of the first multi-dimension space, generating an E dimensional vector, and
      concatenating the E dimensional vectors to form a DE dimensional vector, where D is at least 50 and E is at least 1; and
   a processor in communication with the memory for executing the instructions.

26. The apparatus of claim 25, wherein the embedding instructions include instructions for applying a Nyström approximation to embed the test sample vectors to be labeled by the classifier in the second multi-dimension space.

* * * * *